F. HEUSER.
PROCESS OF MAKING RETURN BENDS.
APPLICATION FILED JAN. 27, 1913.

1,153,224.   Patented Sept. 14, 1915.

WITNESSES
Sanford D. Covington
A. B. Clinun

INVENTOR,
Franz Heuser,
Knight Bros
Attorneys.

UNITED STATES PATENT OFFICE.

FRANZ HEUSER, OF MÜLHEIM-RUHR-STYRUM, GERMANY, ASSIGNOR, BY MESNE ASSIGNMENTS, TO LOCOMOTIVE SUPERHEATER COMPANY, OF NEW YORK, N. Y., A CORPORATION OF DELAWARE.

PROCESS OF MAKING RETURN-BENDS.

1,153,224.  Specification of Letters Patent.  Patented Sept. 14, 1915.

Application filed January 27, 1913. Serial No. 744,552.

*To all whom it may concern:*

Be it known that I, FRANZ HEUSER, a subject of the Emperor of Germany, residing at Mülheim-Ruhr-Styrum, Germany, (whose post-office address is Mülheim-Ruhr-Styrum,) have invented certain new and useful Improvements in Processes of Making Return-Bends, of which the following is a specification.

My invention relates to a process of making what is commonly known as a return or pipe bend and is of particular advantage in connection with the manufacture of superheater elements for smoke tube superheaters. My invention results in the production of a bend as a distinct article of manufacture to which the pipes to be joined by said bend may be united by welding or by any other suitable method.

The object of my invention is to produce a bend of the character and for the purpose specified in a simple and inexpensive manner and with tools of known character.

Briefly described, my invention comprises taking a suitable cap and, by applying pressure at and near the free end thereof, forming at said free end, a pair of tubular sockets connected by a flange or web. The pipes which are to be joined by the return bend are then united to these sockets by welding or in other suitable manner.

My invention also includes one way of producing a suitable cap upon which to form the tubular sockets as aforesaid. According to this feature of my invention I start with a short piece of circular tubing, then partially flatten the same and finally close the ends by pressure, preferably by the action of suitable dies.

My improved method of making a return bend results in a unitary integral structure the dimensions and proportions of which may be quickly and easily changed by starting with tubing of any selected diameter and wall thickness and utilizing suitable corresponding dies.

An advantage of my process is that I may, by suitably proportioning the proper dies, substantially thicken and thereby strengthen the wall of the return bend at its extreme end where, when used as part of a superheater element, it is subject to the maximum heating; this I may do without the use of welding material.

My invention will be better understood by referring to the accompanying drawings in which—

Figure 1:
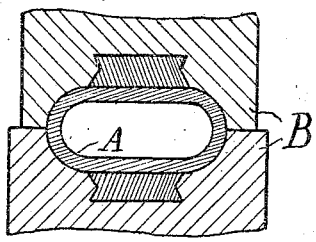
Figure 2:
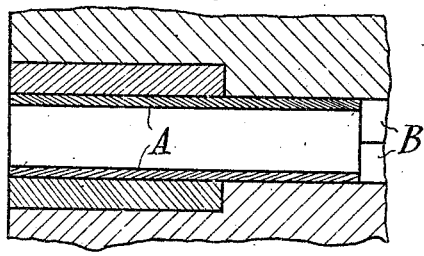
Figure 3:
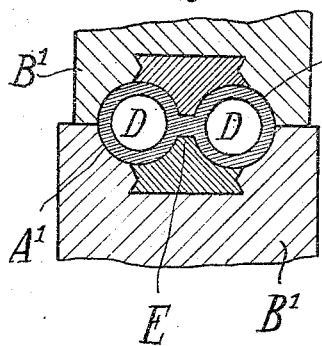
Figure 4:
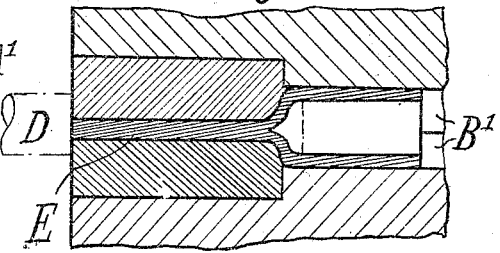
Figure 5:
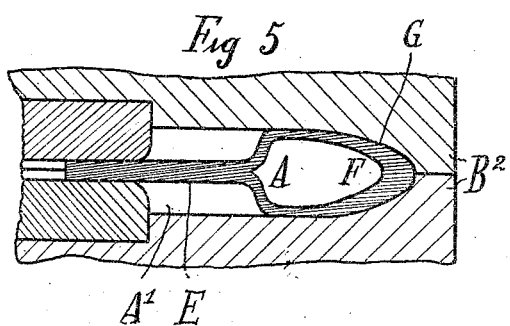
Figure 6:
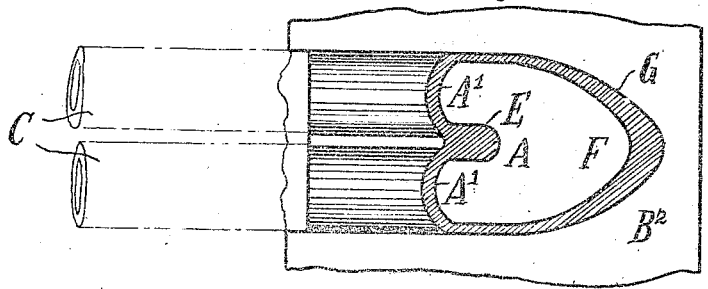

Figures 1 and 2 represent, respectively, a transverse and a central longitudinal section of a tube and dies just after the completion of the first step in my process; Figs. 3 and 4 are similar views just after the completion of the second step of my process; Fig. 5 is a view, similar to that of Figs. 2 and 4, showing the completion of the third step of the process; and Fig. 6 is a plan view, part section, of Fig. 5 with the upper half of the die removed.

Referring to the drawings, a short piece of circular tube A of suitable wall thickness and diameter, is compressed between dies B to an over all thickness equal to the outer diameter of the pipes C which are to be united by the bend. A pair of mandrels D, of suitable diameter, are then inserted within and at opposite sides of the flattened tube A to a predetermined depth. Suitably shaped dies B', provided with longitudinal upstanding portions corresponding to the regions of the tube lying between the two mandrels, and having lateral grooves struck from the same centers as those of said mandrels, are then applied and the walls of the tube thereby compressed around said mandrels so as to form a pair of tubular sockets A'. The flange E which unites these sockets may, preferably, have the two walls of which it consists, welded together. The other end of the flattened tube A is now closed by the use of suitable dies B² (Figs. 5 and 6) and then welded. By varying the dimensions of the dies B² the wall thickness at the extreme end F of the bend may be made substantially greater. Preferably this thickness gradually decreases as the distance from the extreme end of the bend increases until finally it becomes that of the socket walls.

I have described my improved process of making return bends as comprising several different steps to succeed one another in a specified order. This is, however, by no means essential and these several described steps may be taken in some different order, or simultaneously, within the scope of the invention. For example, the tube length might be first flattened and closed at one end and thereupon the sockets A' formed at the other end. Or, when starting with a short circular tube length, one end might be closed and then flattened, and then the sockets A' might be formed upon the other end. Or, by suitably shaping the dies, the several operations of flattening the short circular tube length, closing the end thereof, and forming the sockets A' at the other end thereof, may go on simultaneously.

Having described my invention, I claim:

1. The process of making a return bend which comprises providing a short flattened piece of pipe, applying pressure to the walls adjacent to one end thereof, along lines lengthwise of the piece, so as to form a pair of tubular sockets united by a flange and closing the other end of the piece.

2. The process of making a return bend which comprises providing a short piece of circular pipe, closing one end of said pipe so as to form a cap, and also applying pressure to the walls adjacent to the other end of the piece, along lines lengthwise thereof, so as to form a pair of tubular sockets united by a flange.

3. The process of making a return bend which comprises providing a short piece of circular pipe, applying pressure to said piece so as to both flatten it and close one of its ends, and also applying pressure to the walls adjacent to its other end, along lines lengthwise of the piece, so as to form a pair of tubular sockets united by a flange.

4. The process of making a return bend by reshaping a short piece of circular pipe through the aid of dies and a pair of mandrels, said reshaping comprising partially flattening said pipe in one pair of dies and thereafter closing one end of the pipe with another set of dies and forming the other end of the pipe into two tubular sockets over said mandrels by use of a third set of dies.

5. A process of producing return bends for pipe lines, comprising reshaping a piece of circular pipe by the use of a set of dies and a pair of mandrels; the first step in the process comprising partially flattening said circular pipe in the first pair of dies; the second step comprising forming one end of said pipe into two tubular sockets over said mandrels by the use of the second pair of dies and welding the middle part of the pipe into a longitudinal flange connecting said sockets; and the last step comprising closing the other end of said pipe to form the bend proper by means of a third pair of dies.

6. A process of producing return bends for pipe lines, comprising reshaping a piece of circular pipe by the use of a set of dies and a pair of mandrels; the first step in the process comprising partially flattening said circular pipe in the first pair of dies; the second step comprising forming one end of said pipe into two tubular sockets over said mandrels by the use of the second pair of dies and welding the middle part of the pipe into a longitudinal flange connecting said sockets; and the last step comprising closing the other end of said pipe to form the bend proper, and reinforcing the thickness at the apex of the bend, by means of a third pair of dies.

7. The step in the process of making a return bend which comprises providing a cap piece having at least one end open and applying pressure to the walls adjacent to said open end along lines lengthwise thereof so as to form a pair of tubular sockets united by a flange.

The foregoing specification signed at Barmen, Germany this fourteenth day of January, 1913.

FRANZ HEUSER. [L. S.]

In presence of two witnesses:
ALBERT NUFER,
JULIUS FESTNER.